(12) United States Patent
Persson et al.

(10) Patent No.: US 8,798,658 B2
(45) Date of Patent: Aug. 5, 2014

(54) MINIMIZING DRIVE TEST LOGGED DATA REPORTING

(75) Inventors: Håkan Persson, Solna (SE); Henrik Enbuske, Stockholm (SE); Håkan Palm, Växjo (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/001,687

(22) PCT Filed: Dec. 9, 2010

(86) PCT No.: PCT/SE2010/051355
§ 371 (c)(1),
(2), (4) Date: Oct. 14, 2011

(87) PCT Pub. No.: WO2012/047141
PCT Pub. Date: Apr. 12, 2012

(65) Prior Publication Data
US 2013/0190031 A1    Jul. 25, 2013

Related U.S. Application Data

(60) Provisional application No. 61/389,581, filed on Oct. 4, 2010.

(51) Int. Cl.
*H04B 7/00* (2006.01)
*H04W 24/10* (2009.01)
*G06F 11/34* (2006.01)

(52) U.S. Cl.
CPC ............... *H04W 24/10* (2013.01); *G06F 11/34* (2013.01); *H04B 7/00* (2013.01)
USPC ........ 455/517; 455/500; 455/423; 455/67.11; 455/425; 455/426.1; 370/241; 370/252; 370/310; 370/328; 370/343; 714/45; 714/25; 714/1

(58) Field of Classification Search
CPC .................................................... H04W 24/10
USPC ................. 455/517, 500, 507, 514, 423–425, 455/67.11, 445, 412.1, 412.2, 422.1, 403, 455/522, 68, 69, 426.1, 426.2, 458, 453; 370/241, 252, 310, 328, 329, 338, 343; 714/45, 25, 1
See application file for complete search history.

(56) References Cited

U.S. PATENT DOCUMENTS

2011/0276838 A1* 11/2011 Zhou et al. ..................... 714/45

OTHER PUBLICATIONS

3GPP TS 37.320, 3rd Generation Partnership Project; Technical Specification Group Radio Access Network; Universal Terrestrial Radio Access (UTRA) and Evolved Universal Terrestrial Radio Access (E-UTRA); Radio Measurement Collection for Minimization of Drive Tests (MDT); Overall Description; Stage 2 (Release 10), V10.0.0, Dec. 2010.
3GPP TR 36.805, 3rd Generation Partnership Project; Technical Specification Group Radio Access Network; Study on Minimization of Drive-Tests in Next Generation Networks (Release 9), V9.0.0, Dec. 2009.

* cited by examiner

*Primary Examiner* — Keith Ferguson
(74) *Attorney, Agent, or Firm* — Baker Botts L.L.P.

(57) ABSTRACT

This disclosure pertains to a method in a network node, a method in user equipment, a network node and user equipment in a wireless communications network. More particularly, there is provided methods and platforms for network based control of report messages comprising logged measurements in a wireless communications network. In accordance with some example embodiments, a UE (30) that has stored logged data i.e. logged measurements that are bigger than a single transmission packet, i.e. report message, segments the logged measurements and sends only a portion of the logged measurements that fits into a single report message. The UE (30) also indicates to a network node (28) that additional logged measurements exist at the UE buffer (44).

30 Claims, 6 Drawing Sheets

MINIMIZING DRIVE TEST LOGGED DATA REPORTING

This application is the U.S. national phase of International Application No. PCT/SE2010/051355, filed 9 Dec. 2010, which designated the U.S. and claims the benefit to U.S Provisional No. 61/389,581, filed 4 Oct. 2010, the entire contents of each of which are hereby incorporated by reference.

TECHNICAL FIELD

This disclosure pertains to a method in a network node, a method in user equipment, a network node and user equipment in a wireless communications network. More particularly, there is provided mechanisms for network based control of report messages comprising logged measurements in a wireless communications network.

BACKGROUND

In a typical cellular radio system, wireless terminals, also known as mobile stations and/or User Equipments units (UEs), communicate via a Radio Access Network (RAN) to one or more core networks. The wireless terminals, hereinafter called UEs which is the same as User Equipments, can also be mobile telephones, i.e. "cellular" telephones, and laptops with wireless capability e.g., mobile termination, and thus are, for example, portable, pocket, hand-held, computer-included, or car-mounted mobile devices which communicate voice and/or data via the RAN.

The RAN normally covers a geographical area which is divided into cell areas, also denoted cells, with each cell area being served by a base station e.g., a Radio Base Station (RBS), which in some networks is also called "NodeB" or "B node". A cell is a geographical area where radio coverage is provided by base station equipment at a base station site. Each cell is identified by an identity within the local radio area, which is broadcast in the cell. The base station communicates over the air interface operating on radio frequencies with the UEs within range of the base stations.

In some versions, particularly earlier versions of the RAN, several base stations are typically connected, e.g., by landlines or microwave, to a Radio Network Controller (RNC). The RNC, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UTRAN is essentially a radio access network using wideband code division multiple access for user equipment units (UEs). The Third Generation Partnership Project (3GPP) has undertaken to evolve further the UTRAN and GSM based radio access network technologies.

Long Term Evolution (LTE) is a variant of a 3GPP radio access technology wherein the radio base station nodes are connected directly to a core network rather than to RNCs. In general, in LTE the functions of the RNC node are performed by the RBSs. As such, the RAN of an LTE system has an essentially "flat" architecture comprising RBSs without reporting to RNCs. In LTE networks the base station(s) is/are called eNodeB(s) or eNB(s).

3GPP is in the process of defining solutions for Minimizing Drive Tests (MDT). The intention of the Minimizing Drive Tests (MDT) work is documented in 3GPP TR 36.805 V9.0.0 (2009-12), 3rd Generation Partnership Project; Technical Specification Group Radio Access Network; Study on Minimization of drive-tests in Next Generation Networks (Release 9).

Stage 2 of Minimizing Drive Tests (MDT) is currently being developed in TS 37.320, i.e., 3GPP TS 37.320, "Radio measurement collection for Minimization of Drive Tests (MDT); Overall description; Stage 2". MDT Stage 2 includes a UE measurement logging function and immediate reporting function. The 3GPP TS 37.320 document essentially focuses on the UE measurement logging function.

An important use case for MDT is coverage optimization. For this purpose following UE measurements, or similar functionalities, are considered for UE-internal logging: Periodic, e.g. one every 5 s, downlink pilot signal strength measurements; a serving cell becomes worse than threshold; transmit power headroom becomes less than threshold; Paging Channel Failure i.e. Paging Control CHannel (PCCH) decode error; and Broadcast Channel failure.

The network can request the UE to perform logging of measurements. The UE executes measurements and logs these measurements internally in a sequential manner, containing, e.g., some hour of logged measurement information.

As described in FIG. 1, the UE indicates to the network if it has available log i.e. available logged measurements. The network node i.e. eNB/RNC determines if it should request the logged measurements or not. If it decides to do so then a request is sent to the UE to deliver the log in a report message. From the eNB/RNC, the reported logged measurements may further be sent to an OAM server or similar.

The current 3GPP assumptions on this log (i.e. logged measurements) feature are, e.g., as follows: the UE is required to maintain only one log at a time; one log only contains measurement information collected in one Radio Access Technology (RAT); a log can only be reported and indicated when the UE is in connected state; If UE is requested to start logging, e.g., by configuration, a possibly old log and configuration stored in UE is erased.

What the logged measurement report message in signal number 4 in FIG. 1 should look like has not yet been decided, as of the filing of this application. Some proposals for management of measurement report have been proffered.

As one example proposal for management of measurement reports, it has been suggested that a log i.e. logged measurements, are to be sent in a single packet, and keeping that single packet within the size limits of a Packet Data Convergence Protocol (PDCP) Protocol Data Unit (PDU). Keeping the single packet within the size limits of a PDCP PDU makes it possible to use a Radio Resource Control RRC message for reporting without being segmented into several smaller packets before being sent to the receiving node i.e., the eNB or NB/RNC in LTE or UMTS, respectively. One option of this proposal would be limiting the maximum size of a log in a UE to one RRC message that fits into one PDCP payload packet.

As another example proposal for management of measurement reports, it has been suggested to send a log i.e. a logged measurement that is larger than a RRC message with several RRC messages.

However, there are disadvantages to both example proposals mentioned above. For example, limiting the log size could prevent logging to complete for the whole configured run time i.e. logging duration, which can be several hours. The log could fill the limited log buffer in the UE before any measurement report has been possible to send to the network node. Before the configured logging duration time has ended, the UE would stop the logging so that to only allow the log size to be a single packet e.g. single RRC packet, and relevant measurements reports may not thereafter be logged. Also in the current MDT configuration a start time for the logging is not configurable. This means that for a prolonged logging campaign a long period between logging instances may be needed in the MDT configuration, alternatively new MDT configuration needs to be provided from the OAM periodically to be conveyed to MDT capable UEs.

For the other proposal, sending too many RRC packets in a row could, in poor radio environments or when handover would occur, create problems with the radio connections and could also create unnecessary radio link failures that will make the users suffer and logged data be lost.

SUMMARY

The technology disclosed herein concerns network based control of report messages comprising logged measurements in a wireless communications network, which overcomes at least some of the above mentioned disadvantages and which allows multiple partial report messages to be sent.

In accordance with some example embodiments, a UE that has stored logged data i.e. logged measurements that are bigger than a single transmission packet, i.e. report message, segments the data and sends only a portion of the data that fits into a single report message, and also indicates that more logged measurements exists at the UE.

In a first example of embodiment, there is disclosed a method in a network node for network based control of report messages in a wireless communications network. The network node being configured to serve a user equipment, UE, and to receive report messages from the user equipment. The method comprises sending a request to the UE to start transmitting logged measurements in a report message. The network node then receives the report message comprising the logged measurements from the UE, and determines if the received report message comprises an indicator of additional logged measurements not yet transmitted, and if so, decides if the additional logged measurements need to be requested.

In a second example of an embodiment there is disclosed a network node for network based control of report messages in a wireless communications network. The network node being configured to serve a user equipment, UE, and to receive report messages from the user equipment. The network node comprises a network node communications interface and a network node processor circuit. The network node communications interface being configured to send a request to the UE to start transmitting logged measurements in a report message, and to receive the report message comprising the logged measurements. The network node processor circuit being configured to determine if the received report message comprises an indicator of additional logged measurements not yet transmitted; and if so, to decide if the additional logged measurements need to be requested.

In a third example of an embodiment, there is disclosed a method in a User Equipment, UE, for assisting in network based control of report messages in a wireless communications network. The UE is being in connection with a serving network node and configured to transmit report messages to the network node upon request. The UE is further configured to periodically perform radio condition measurements and store the periodically performed measurements in a UE buffer as logged measurements. The method comprising: receiving a request, in the UE, from the network node to start transmitting logged measurements in a report message; determining if the logged measurements fit in the report message; and if not, including in the report message an indicator of additional logged measurements not yet transmitted; and, transmitting the report message, comprising the indicator, to the network node as a response to the request.

In a fourth example of an embodiment, there is disclosed a User Equipment, UE, for assisting in a network based control of report messages in a wireless communications network. The UE is being in connection with a serving network node and is configured to transmit report messages to the network node. The UE is further configured to periodically perform radio condition measurements and store the periodically performed measurements in a buffer as logged measurements. The UE comprises a UE communications interface and a UE processor circuit. The UE communications interface is configured to receive a request from the network node to start transmitting logged measurements in a report message, and to transmit the report message comprising the logged measurements. The UE processor circuit is configured to determine if the logged measurements fits in the report message, and if not, indicating in the report message to be transmitted an existents of additional logged measurements not yet transmitted.

An advantage achieved by some of the above mentioned embodiments is that due to use of indicator in report message of further remaining logged measurements providing the network, i.e. a network node, with information needed to decide a timing of transmission of the logged measurements and a timing of when more logged measurements should be requested.

Another advantage achieved by at least some of the above mentioned embodiments is to make it possible to have longer logging duration and/or conduct more frequent measurements without overflow in log memory in UE e.g. UE buffer.

Another advantage achieved by some of the above mentioned embodiments is to provide the network node with information about logged measurements making it possible to determine the amount of logged measurements kept in a UE.

The foregoing and other objects, features, and advantages will become apparent from following more particular descriptions of preferred embodiments and aspects of embodiments as will be illustrated by accompanying drawings in which reference characters refer to the same parts throughout various views.

BRIEF DESCRIPTION OF THE DRAWINGS

The drawings are not necessarily to scale, emphasis instead being placed upon illustrating principles of the disclosure.

DETAILED DESCRIPTION

Figure 1:
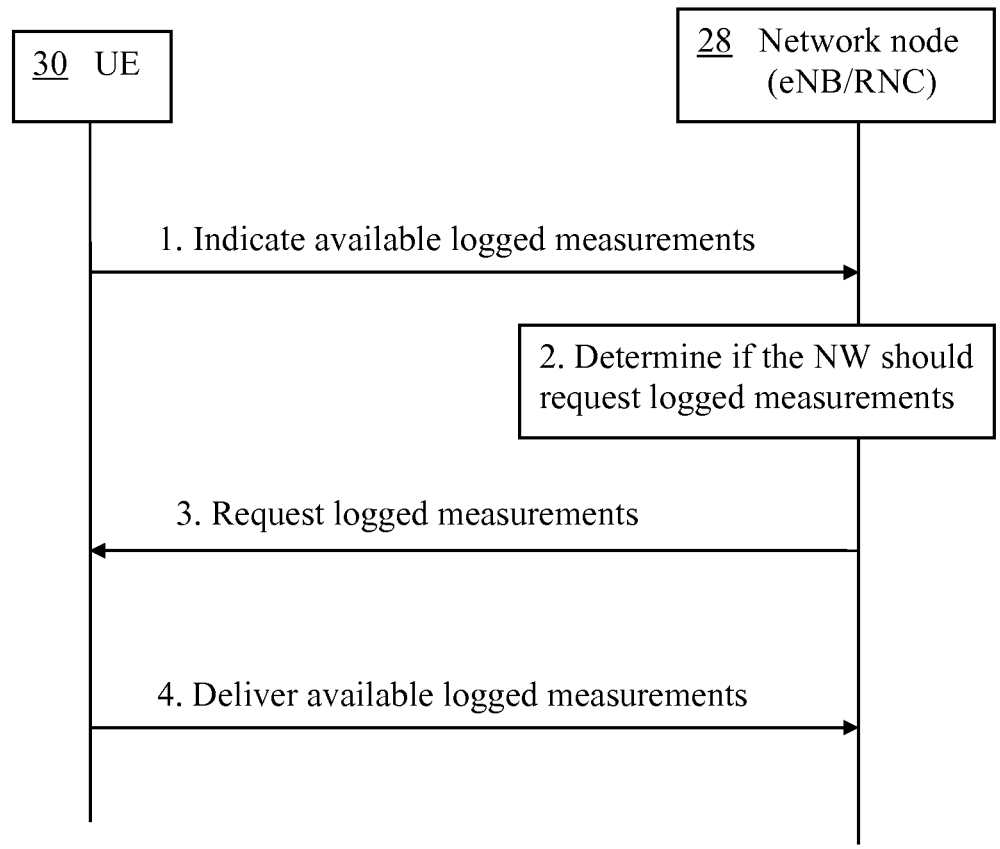
FIG. 1 is a signaling scheme illustrating how logged measurements are reported according to prior art.
Figure 2:
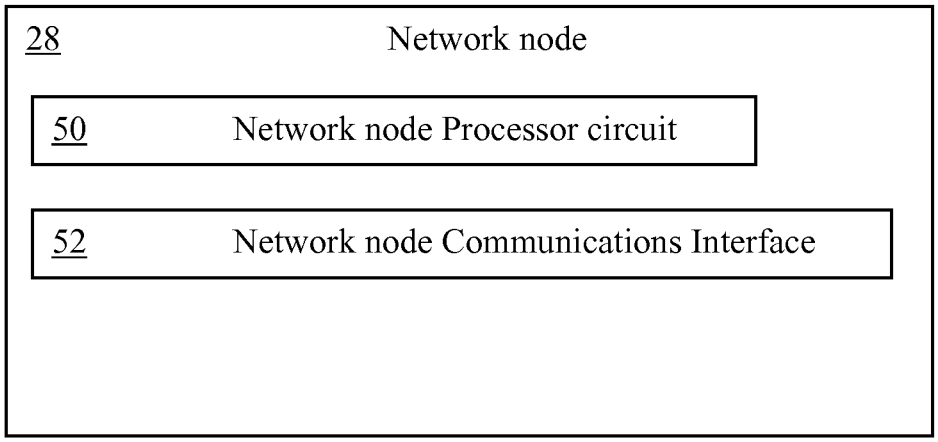
FIG. 2 is a schematic block diagram illustrating example embodiments of a network node and a user equipment.
Figure 2:
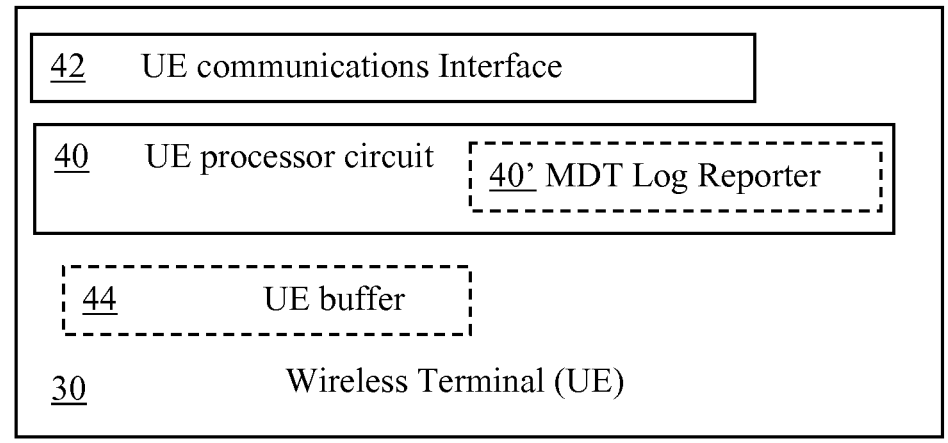

FIG. 2 illustrates portions of an example embodiment of a communications system/network, and particularly portions of a Radio Access Network (RAN) 20 comprising at least one network node 28 and a wireless terminal, hereinafter denoted User Equipment, (UE) 30. Depending on a particular type of RAN utilized and delegation of nodal responsibilities, the network node 28 may be a base station node e.g., an NodeB in UMTS or an eNodeB in Long Term Evolution (LTE)) or a Radio Network Controller (RNC) node in UMTS. Thus, the UE 30 communicates over radio interface 32 with the network node 28, either directly over radio interface 32 with the network node 28 in case of the network node 28 being a base station type node, or over the radio interface 32 and through a base station in the case of the network node 28 being a radio network controller (RNC) node or an Mobility Management Entity (MME) which is a control node which processes signaling between the UE and the Core Network (CN) and provides Visitor Location Register (VLR) functionality for the Evolved Packet System (EPS).

As mentioned above, the UE 30 can be a mobile station such as a mobile telephone ("cellular" telephone) or laptop with wireless capability (e.g., mobile termination), and thus can be, for example, a portable, pocket, hand-held, computer-included, or car-mounted mobile device which communicates voice and/or data via radio access network.

In accordance with one of its aspect, the technology disclosed concerns generation and/or transmission and/or use of multiple partial report messages with logged measurements such as MDT log packets, also denoted MDT log or MDT log data. As such, FIG. 2 shows an example embodiment of network node 28 or UE 30, which comprises a UE communication interface 42 and a UE processor circuit 40. Note that the UE may be seen as a serving point. The UE processor circuit may include a buffer 44, i.e. UE buffer, for storing logged measurements, not shown in figure, and in another embodiment the buffer 44 is within the UE 30.

FIG. 2 also illustrates network node 28 as comprising a network node processor circuit 50 and network node communications interface 52 (i.e. a communications interface of the network node). The network node processor circuit 50 may be, or comprise, a logged measurements requestor/processor (not shown in figure) to be used for requesting logged measurements, such as MDT log, in report message(s).

According to one example of an embodiment, the network node 28 is used for network based control of report messages comprising logged measurements in a wireless communications network, the network node 28 being configured to serve the UE 30, UE, and to receive report messages from the UE 30.

Continuing with the description of FIG. 2, the network node communications interface 52 is, or may be, configured to send request(s) to the UE 30 to start transmitting logged measurement(s) in report message(s), and to receive the report message(s) comprising the logged measurements. The logged measurements may comprise one or more of the following: measurement time stamps for each performed measurement; UE buffer state condition; positioning information of UE; periodically measured downlink pilot signal strength; serving cell conditions; transmit power headroom conditions; paging channel failure(s); maximum required memory supported by UE; and broadcast channel failure(s).

According to one embodiment, the network node communications interface 52 may be configured to receive, from the UE 30, an indication of existents of logged measurements that are available. Note, that the "additional logged measurements" indicator is conveyed in the UE information report message while the indication of logged measurements available is conveyed in already existing/specified signaling.

According to one embodiment, the network node communications interface 52 may be configured to request the report message(s) directly from the UE 30 or from another network node, e.g. RNC, MME, RBS or other similar node.

According to one embodiment, the network node communications interface 52 may be configured to request the report message upon receiving a UE access request initiated by a UE handover procedure from another network node to the network node. The request may for example be a RRC connection request. The network node communications interface 52 may also be configured to receive a network node message from the other network node i.e. another eNodeB, RNC or RBS, comprising UE specific information. The UE specific information may further comprise the indicator indicating additional logged measurements not yet transmitted.

The network node processor circuit 50, mentioned above in relation to FIG. 2, is configured to determine if the received report message(s) comprises an indicator of additional logged measurement(s) not yet transmitted; and if so, to decide if the additional logged measurements need to be requested. According to one embodiment, the network node processor circuit 50 may be configured to decide if the additional logged measurements need to be requested based on one or more of the following: interference level experienced in a cell; radio condition measurements experienced in a cell; available radio resource; network node capacity; UE buffer state condition etc.

According to one embodiment, the network node processor circuit 50 may be configured to determine if the indicator indicates that there are logged measurements in a UE buffer 44 that do, or do not, fit in a single subsequent report message.

According to one embodiment, the network node processor circuit 50 may be configured to decide to request all the logged measurements in the buffer 44 of the UE in one subsequent request, or repeatedly upon receiving each report message. The decision may also be based on received status information of the buffer 44 in the UE 30 being for example overloaded. Note that configured to or adapted to in relation to functionality of circuits and devices mentioned above and throughout the whole disclosure are expressions that may be used having a similar or same meaning.

It should be appreciated that the network node processor circuit 50 may comprise an MDT log requestor/processor 50' (not shown in FIG. 2) which may be implemented in platform fashion, e.g., implemented by a computer/processor executing instructions of non-transient signals and/or by a circuit.

Likewise from a UE perspective, reference made to FIG. 2, the UE 30 may be, or is, used for assisting in network based control of report messages comprising logged measurements in a wireless communications network. The UE 30 is being in connection with the serving network node 28 and is configured to transmit report message(s) to the network node 30. The UE 30 may further be configured to periodically perform radio condition measurements and store the periodically performed measurements in the buffer 44 as logged measurements. Such logged measurements may be MDT log reports.

The UE communications interface 42 mentioned above in relation to FIG. 2, is configured to receive a request from the network node 28 to start transmitting logged measurements in report message(s), and to transmit/send the report message(s) comprising the logged measurements. The UE processor circuit 40 is configured to determine if the logged measurements fits in the report message(s), and if not, indicating in the report message to be transmitted an existents of additional logged measurements not yet transmitted.

According to one embodiment of an example implementation of a UE 30 in which the UE processor circuit 40 may be, or may comprise, a multiple partial MDT log reporter 40' (FIG. 2 dashed lines). The multiple partial MDT log reporter 40' may comprise a log report generator and data logging unit (not shown in FIG. 2). The multiple partial MDT log reporter 40' works in conjunction with a measurement unit (not shown in FIG. 2), and stores records of measurements in data logging unit. The log report generator may further comprise a packet identifier generator and "more data" i.e. additional data, flag generator.

The technology disclosed above, and in relation to some of the earlier mentioned embodiments, includes support for logged measurements, or an MDT log size, which exceeds a maximum size of the report message which may for example be a Packet Data Convergence Protocol (PDCP) packet. The technology disclosed herein also introduces and provides an indication from the UE 30 of additional logged measurements or MDT log data that remains in the UE buffer 44. In accordance with some example embodiments, a UE 30 that has stored logged measurements, sometimes denoted logged data, that are bigger than a single report message i.e. transmission packet, segments the logged measurements, and sends only a portion of the logged measurements that fits into a single report message. The UE 30 also indicates that more logged measurements exist at the UE 30 in the buffer 44. This indication of further remaining logged measurements allows the network node 28 to decide a timing of transmission of the logged measurements and a timing of when more logged measurements should be requested. This may for example depend on radio condition measurements or UE buffer status information.

The UE 30 will take a part of the logged measurements and put into the payload of the report message. The UE 30 will, if more logged measurements are still available, set a "more" or "additional" bit indicating to the network node 28, or by other means indicate to the network node 28, that there are more logged measurements available in the UE 30. The network node 28 will then, when it believes more data should be obtained e.g. based on: interference level experienced in a cell; radio condition measurements experienced in a cell; available radio resource; network node capacity; UE buffer state condition etc., request more logged measurements. When a request is done then the process may be repeated. A new decision may be taken after a new report message is received, and so on. In other words, upon reception of indication from UE, the network node 28 takes a decision (based on current radio conditions, node capacity) whether the network node 28 shall request more logged measurements "data" from the UE now or request it at a later point in time. This "later point in time" could be predefined e.g. 15 s later. In one example an internal algorithm may for instance check to see if no Hand Over (HO) is imminent or other more vital procedure is at hand. The report messages may be lost if unsuccessfully reporting happens just before a HO. In one example, the network node 28 may be configured to continue requesting reporting of logged measurements (MDT logs) in report messages until there are no more logged measurements to report.

Figure 3:
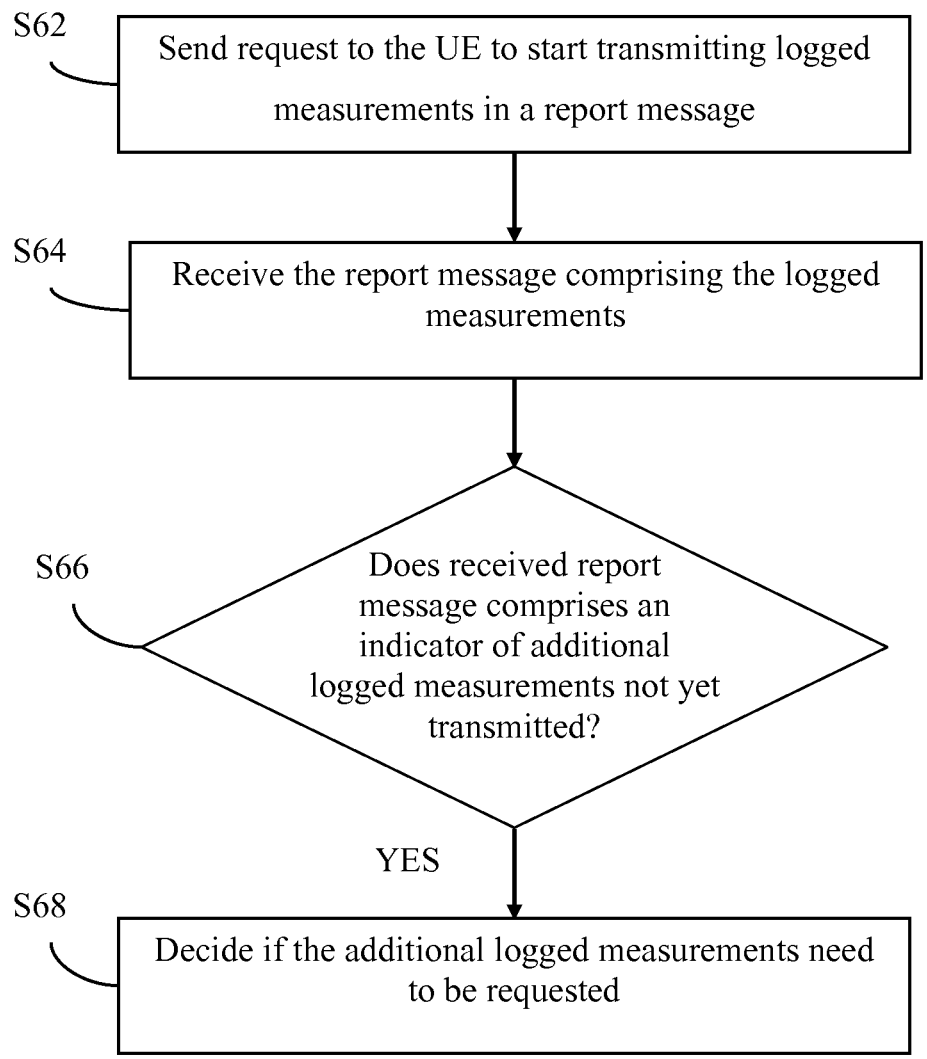
FIG. 3 is a flowchart depicting an example embodiment of a method in a network node.

An example of an embodiment of a method that may be implemented in the network node 28 is illustrated by FIG. 3. The method is used for network based control of report messages comprising logged measurements in a wireless communications network. According to the method, the network node 28 which is being configured to serve a UE 30, receives report messages from the UE 30 as mentioned above in relation to FIG. 2. More particularly, the method comprises: sending S62 a request to the UE to start transmitting logged measurements in a report message; receiving S64 the report message comprising the logged measurements; determining S66 if the received report message comprises an indicator of additional logged measurements not yet transmitted; and if so, deciding S68 if the additional logged measurements need to be requested.

Figure 4:
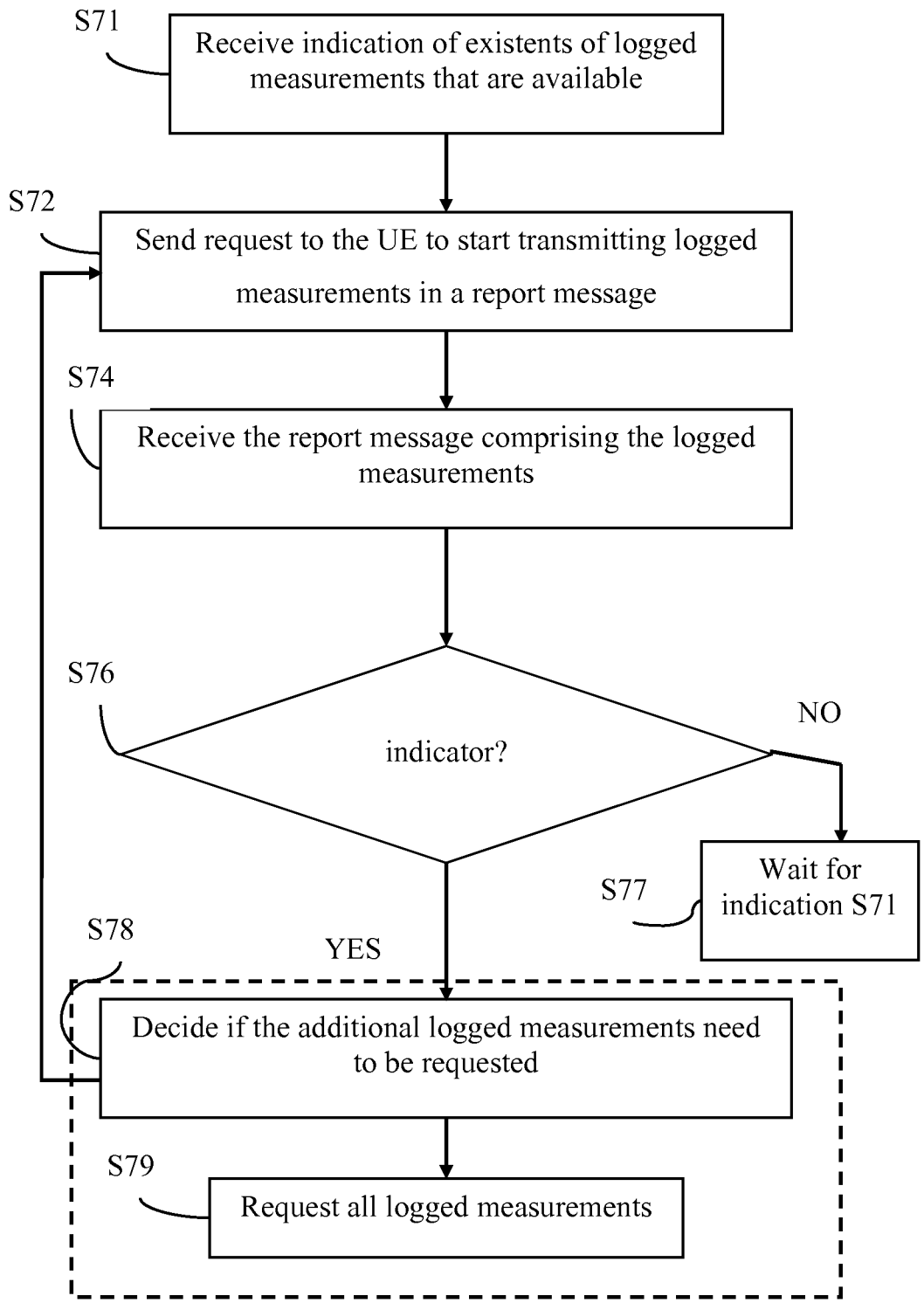
FIG. 4 is a flowchart depicting further example embodiments of a method in a network node.

Yet an example of an embodiment of a method for implementation in the network node 28 is illustrated by FIG. 4. The general steps i.e. S72, S74, S76 and S78 correspond to S62-S68 mentioned above. In this example method comprises the network node 28 first receiving S71, e.g. from the UE 30, an indication of existents of logged measurements that are available i.e. the UE buffer 44 is not empty or more data exists in UE buffer 44. Note that this indication is different from the indicator indicating additional logged measurements.

According to the method, the network node 28 decides to send S72 request to the UE 30 to start reporting and receives S74 a report message as a response. The network node 28 then determines if the report message, which also comprises logged measurements and reporting time stamp, comprises an indicator of additional logged measurements not yet reported. If so, the network node 28 may decide S78 to request these additional logged measurements and therefore restarts at S72. If no indicator is included, the network node 28 will await S77 a new indication S71, and restarts the procedure at S72. The network node 28 upon deciding S78 to request additional logged measurements may decide to request S79 all logged measurements in one decision instead of requesting one subsequent report message at a time. In some example embodiments, if the UE 30 indicates that more than one reporting message is needed for the logged measurements in its UE buffer 44, several bits may then be used to indicate that. The network node 28 may then choose to request multiple messages if the network node 28 so wants.

Figure 5:
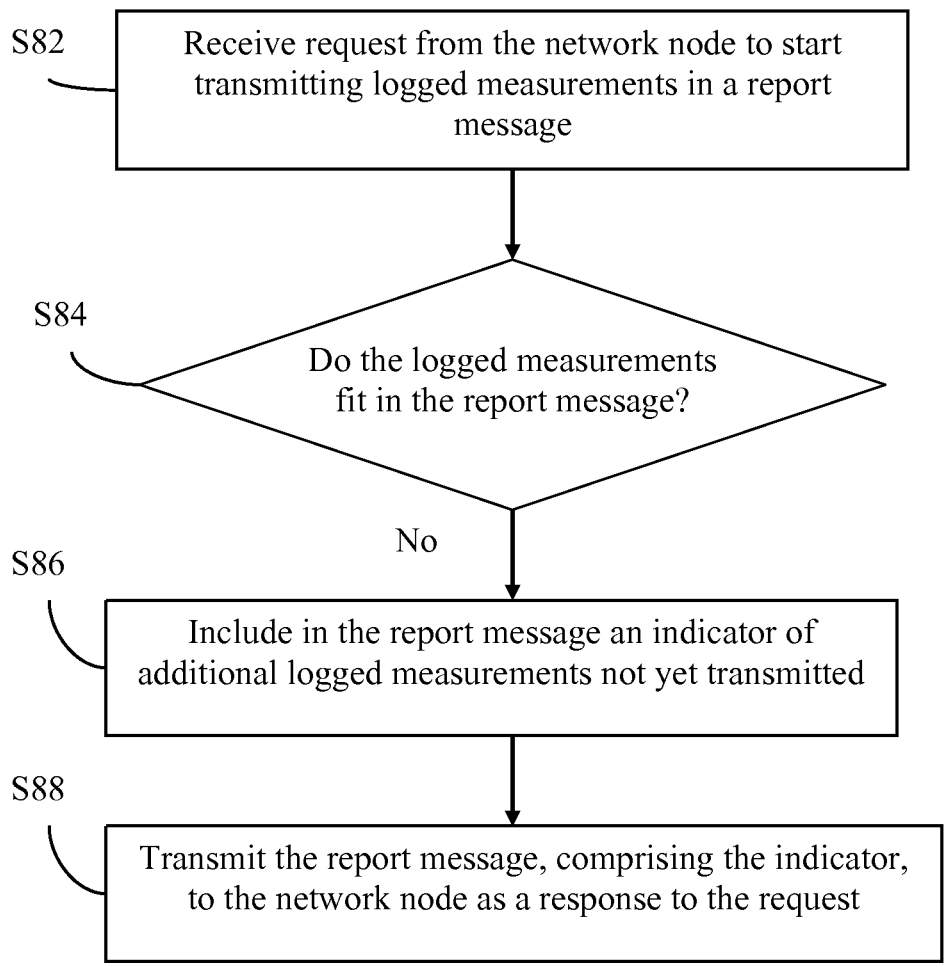
FIG. 5 is a flowchart depicting an example embodiment of a method in a user equipment.

From a UE perspective, and an example of an embodiment which illustrates a method in a UE, reference is now made to FIG. 5. The UE 30 is configured to periodically perform radio condition measurements and store the periodically performed measurements in a UE buffer 44 as logged measurements. The method in the UE 30 for assisting in network based control of report messages comprising logged measurements in a wireless communications network, comprises: receiving S82 a request from the network node 28 to start transmitting logged measurements in a report message; determining S84 if the logged measurements fit in the report message; and if not, including S86 in the report message an indicator of additional logged measurements not yet transmitted; and, transmitting S88 the report message, comprising the indicator, to the network node 28 as a response to the request (S62; S72).

Figure 6:
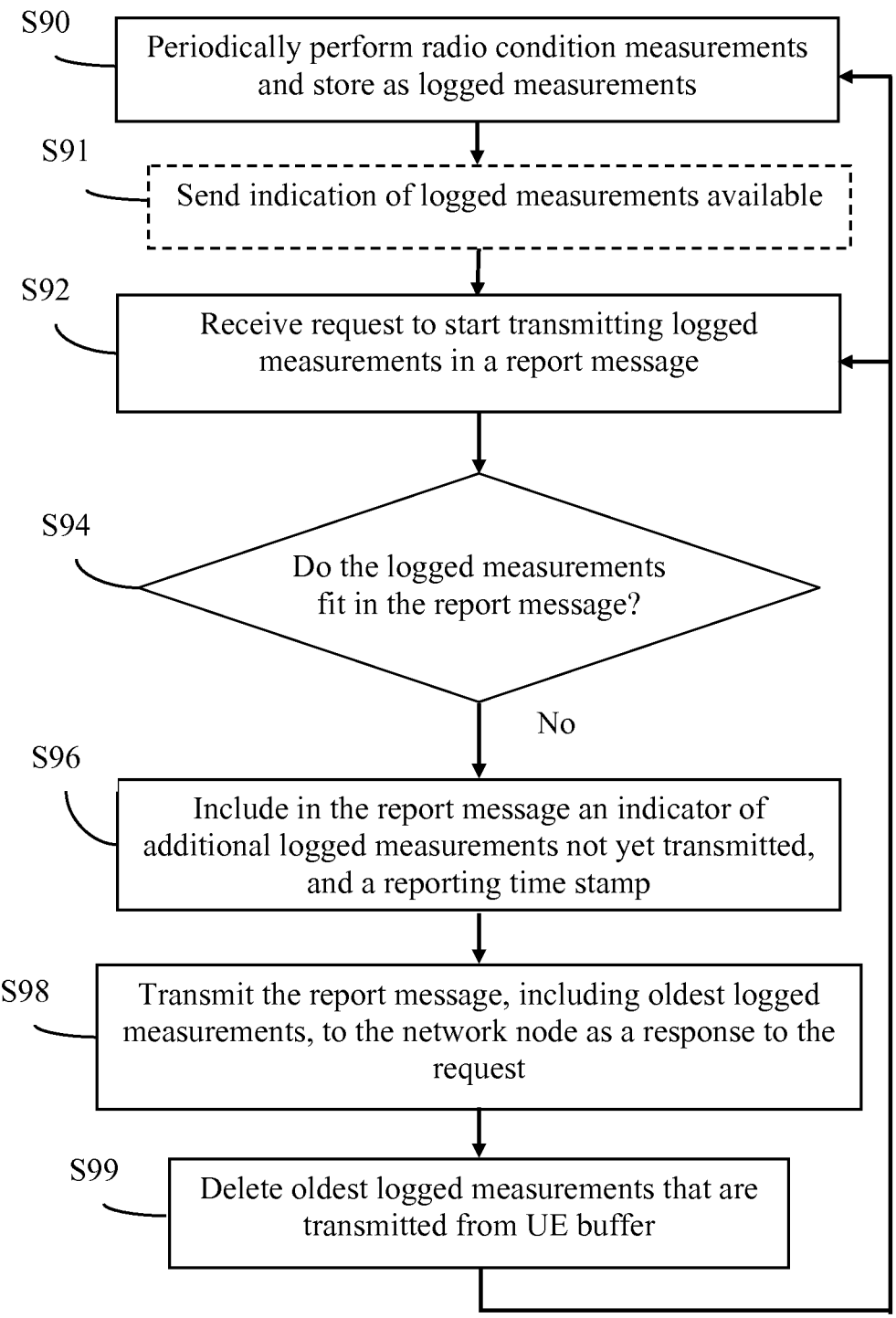
FIG. 6 is a flowchart depicting further example embodiments of a method in a network node.

In an example of an embodiment and UE mode, the technology disclosed herein encompasses the following acts and capabilities, as illustrated by FIG. 6:

S90: UE periodically performs measurements and logs radio condition measurements, and possibly detailed positioning information of the UE 30, and stores the measurements as logged measurements in the UE buffer 44 i.e. in internal memory of the UE 30.

According to one embodiment the logged measurements in UE buffer 44 may be built up as "records" that include a "time stamp" indicating the time when the radio measurement was taken i.e. "measurement time stamp" and logged measurements. The record may optionally also include detailed position information of the UEs geographical position. The "records" may have variable size. The size of the logged measurements, sometimes denoted log size, in UE buffer 44 may be bigger than is possible to fit into one single report message to be sent from UE to network node.

S92: When the UE 30 receives a request from the network node 28 to start transmitting/reporting logged measurements, the UE 28 takes the number of "records" i.e. logged measurements, from the UE buffer 44 i.e. internal log, typically in the order of storage, that fits into the report message, and "advances" an internal pointer such that next-stored "records" will be included in the next report message next time the UE 30 is requested to report logged measurements.

This step, i.e. S92, may be preceded by that the UE 30 sending S91 an indication to the network node 28 making it aware of logged measurements that are available at the UE 28.

S94: Upon receiving (S92) a request to start transmitting the UE 30 then determines if the logged measurements fit in a single report message or not.

If the logged measurements fit in one report message then no indicator is added or a dedicated bit for the indicator is left empty i.e. null is sent in that bit. Alternatively, an indication is added giving that no more information is available.

S96: In case the UE 30 has more logged measurements ("records") stored in the UE buffer 44 not yet reported an indicator of "additional logged measurements" i.e. more data exist is included in the report message.

A "Time stamp" value i.e. "Reporting time stamp" or other identifier is added to the report message at report message transmission. Alternatively, instead of including a reporting time stamp into the report message, a sequence number, stepped by one with each report message transmission may be used. Note that this reporting time stamp is different from the measurement time stamp added upon performing and logging the measurement.

S98: The UE 30 then transmits the report message, including oldest logged measurements obtained from UE buffer 44, to the network node 28 as a response to the request. The report message may therefore comprise logged measurements, a reporting time stamp and detailed positioning information of the UE 30.

S99: The UE 30 then deletes the transmitted/reported logged measurements from its buffer, i.e. UE buffer 44, and "advances" an internal pointer such that next-stored "records" will be included in the next report message. After receiving a new request from the network node 28 the UE 30 may then transmit/report logged measurements i.e. repeat steps S92-S99 and include new logged measurements i.e. "records", from the UE buffer 44, according to its internal pointer. Alternatively, or in combination with the reporting, the UE 30 may start again at step S90.

Note, that in current "MDT" general implementation the logging of measurements as logged measurements may only be done when UE is in "idle" state and the sending of logged measurements (MDT logs) in report messages may only be done when the UE is in "connected" state.

In some example embodiments, if the UE buffer 44 is almost full or if a size limitation is to be reached, the UE 30 may indicate such conditions to the network node 28 during the sending S91 or adding that information during S96 and sending it during S98. The network node 28 may then prioritize the retrieval of logged measurements in order not to stop logging and/or loose logged measurements.

During the repeated sequence of messages between the UE 30 and the network node 28, to convey complete logged measurements from the UE 30 to the network node 28, there may be a need to change cell and/or serving Base Station (BS) e.g. during a handover form a first BS (eNB1; NB1; RNC1; RBS1) to a second BS (eNB1; NB1; RNC1; RBS1).

One way to handle cell change and/or BS change situations is that the UE indicate availability when it is connects to the second BS, e.g. according to S91 of FIG. 6. Thus the UE 30 being served by a first BS (e.g. eNB1) and which has for example sent two report messages to first BS, when performing a handover starts by sending an indication, i.e. sends S91 indication of logged measurements available, to second BS (e.g. eNB2) and then upon request starts reporting to second BS a third report message. Logged measurements that are sent in first and second report messages are generally deleted from UE buffer 44 and therefore not longer available.

A second way, or alternative, to handle this situation is that the information that the first BS (e.g. eNB1) has received with respect to "logged measurements available" as of step S91, is transferred to second BS (e.g. eNB2). The information is transferred based on a request from second BS or automatically, including any related information like trace references, etc. The idea here is to include the "indication" in already existing/specified handover preparation signaling (between eNB1 and eNB2) that is "preparing" the eNB2, before the UE is actually handed over (commanded) from eNB1 to eNB2.

In some situations, "trace references" and "logged measurements available" indication (S91) may be forwarded between RAN 20 nodes. In such cases, the UE 30 may also include the trace references in the report message when the UE 30 transmits a first report message to a RAN node after handover. Note that this first report message, as of the example mentioned above in relation to the first way of handling the situation, would be the third report message.

Thus, the technology disclosed herein, in one of its aspects, supports and/or facilitates a log size exceeding a maximum size of a reporting message e.g. a PDCP packet. If the reporting loss/performance is considered an issue and needs to be addressed, while a restriction of a UEs total log size, in UE buffer or UE memory, is not wanted, then the UE that has stored logged measurements i.e. logged data, that is bigger than a single payload PDU (e.g due to PDCP restriction) may segment the logged measurements and send only a part that fits into a single report message/packet e.g., a message size in the UE response message has a fixed size while the MDT log itself has another limit e.g. UE buffer size restriction in UE 30 etc. To handle this, an indication in the report message e.g. the UE MDT log report, on that additional/more logged measurements exists is provided. This allows the network node 28 to decide the timing for when measurements should be requested and/or (re-)configured. Relying on the "report available bit" only would require that the UE again transients to RRC connected which may delay the transfer of logged measurements further, possibly involving UE log memory being exhausted, new logged MDT configuration or Hand Over (HO) to other Radio Access Technology (RAT) etc.

Thus, with a report message size restriction, the UE 30 shall be able to partition the logged measurements into a maximum fixed size reporting message e.g. an RRC message.

Currently the RRC message for MDT also carries information for RACH optimization (SON) and other optionally configured information. One consequence of the presence of other information in the RRC message/PDU using a size restriction would be that it possibly depends on the RRC message construction and configuration, or that the maximum size of a report message is always set according to a worst case scenario.

In view of the reasons above, no special handling of the RRC message/log size might be needed as a result of MDT. Retaining normal handling of RRC messages etc simplifies the considerations that need to taken in the network node 28 and UE 30.

The technology disclosed herein affords several advantages. Among the advantages are the following. The technology allows for long logging run times that may create large logged measurements sizes while the network node 28 controls the reporting time. The technology facilitates that the network node 28 may determine an appropriate time of reporting without loosing logged measurements.

In the above description, for purposes of explanation and not limitation, specific details are set forth such as particular architectures, interfaces, techniques, etc. in order to provide a thorough understanding. However, it will be apparent to those skilled in the art that the above mentioned embodiments may be practiced in a ways that depart from these specific details. That is, those skilled in the art will be able to devise various arrangements which, although not explicitly described or shown herein, embody the principles of the embodiments and are included within their spirit and scope. In some instances, detailed descriptions of well-known devices, circuits, and methods are omitted so as not to obscure the description of the present embodiments with unnecessary detail. All statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams of FIG. 2 herein may represent conceptual views of illustrative circuitry or other functional units embodying the principles of the technology. Similarly, it will be appreciated that any flow charts as of FIG. 3-FIG. 6, state transition diagrams, pseudo code, and the like represent various processes which may be substantially represented in computer readable medium and so executed by a computer or processor, whether or not such computer or processor is explicitly shown.

Functions of various elements including functional blocks of FIG. 2, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks of network node 28 or UE 30 may include or encompass, without limitation, Digital Signal Processor (DSP) hardware, reduced instruction set processor, hardware (e.g., digital or analog) circuitry including but not limited to Application Specific Integrated Circuit(s) [ASIC], and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

In the example of FIG. 5 the platform depicted by line 70 has been illustrated as computer-implemented or computer-based platform. Another example platform for wireless terminal 70(5) can be that of a hardware circuit, e.g., an application specific integrated circuit (ASIC) wherein circuit elements are structured and operated to perform the various acts described herein.

Although the description above contains many specificities, these should not be construed as limiting the scope of the invention but as merely providing illustrations of some of the presently preferred embodiments of this invention. It will be appreciated that the scope of the present invention fully encompasses other embodiments which may become obvious to those skilled in the art, and that the scope of the present invention is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the present invention, for it to be encompassed hereby.

The invention claimed is:

1. Method in a network node for network based control of report messages in a wireless communications network, the network node being configured to serve a user equipment, UE, and to receive report messages from the UE, the method comprising:
    sending a request to the UE to start transmitting logged measurements in a report message;
    receiving the report message comprising logged measurements;
    determining if the received report message comprises an indicator of additional logged measurements not yet transmitted; and if so,
    deciding if the additional logged measurements are to be requested.

2. The method according to claim 1, wherein the method comprises receiving, from the UE, an indication of existents of logged measurements that are available.

3. The method according to claim 1, wherein the logged measurements comprises one or more of the following: measurement time stamps for each performed measurement; UE buffer state condition; positioning information of UE; periodically measured downlink pilot signal strength; serving cell conditions; transmit power headroom conditions; paging channel failure(s); and broadcast channel failure(s).

4. The method according to claim 1, wherein the report message is received directly from the UE or via another network node.

5. The method according to claim 1, wherein the deciding is based on one or more of the following: interference level experienced in a cell; radio condition measurements experienced in a cell; available radio resource; network node capacity; UE buffer state condition etc.

6. The method according to claim 1, wherein the determining comprises determining if the indicator indicates that there is logged measurements in a buffer of the UE that do, or do not, fit in a single subsequent report message.

7. The method according to claim 6, wherein the deciding comprises deciding to request all the logged measurements in the buffer of the UE in one subsequent request.

8. The method according to claim 1, wherein the method comprises receiving a previously sent report message from another network node(s), automatically or upon request.

9. The method according to claim 1, wherein the sending of a request is initiated by a UE handover procedure from another network node to the network node.

10. The method according to claim 9, wherein the method comprises receiving a network node message from the other network node comprising UE specific information.

11. The method according to claim 10, wherein the UE specific information comprises the indicator of additional logged measurements not yet transmitted.

12. A network node for network based control of report messages in a wireless communications network, the network node being configured to serve a user equipment, UE, and to receive report messages from the user equipment, the network node comprises:
- a network node communications interface configured to send a request to the UE to start transmitting logged measurements in a report message, and to receive the report message comprising the logged measurements;
- a network node processor circuit configured to determine if the received report message comprises an indicator of additional logged measurements not yet transmitted; and if so, to decide if the additional logged measurements need to be requested.

13. The network node according to claim 12, wherein the network node communications interface is configured to receive, from the UE, an indication of an existents of logged measurements that are available.

14. The network node according to claim 12, wherein the logged measurements comprises one or more of the following: measurement time stamps for each performed measurement; UE buffer state condition; positioning information of UE; periodically measured downlink pilot signal strength; serving cell conditions; transmit power headroom conditions; paging channel failure(s); maximum required memory supported by UE; and broadcast channel failure(s).

15. The network node according to claim 12, wherein the network node communications interface is configured to request the report message directly from the UE or from another network node.

16. The network node according to claim 12, wherein the network node processor circuit is configured to decide if the additional logged measurements need to be requested based on one or more of the following: interference level experienced in a cell; radio condition measurements experienced in a cell; available radio resource; network node capacity; UE buffer state condition etc.

17. The network node according to claim 12, wherein the network node processor circuit is configured to the determine if the indicator indicates that there is logged measurements in a buffer of the UE that do, or do not, fit in a single subsequent report message.

18. The network node according to claim 17, wherein the network node processor circuit is configured to decide to request all the logged measurements in the buffer of the UE in one subsequent request.

19. The network node according to claim 12, wherein the network node communications interface is configured to request the report message upon receiving a UE access request initiated by a UE handover procedure from another network node to the network node.

20. The network node according to claim 19, wherein the network node communications interface is configured to receive a network node message from the other network node comprising UE specific information.

21. The network node according to claim 19 wherein the UE specific information comprises the indicator of additional logged measurements not yet transmitted.

22. Method in a User Equipment, UE, for assisting in network based control of report messages in a wireless communications network, the UE being in connection with a serving network node and configured to transmit report messages to the network node upon request, and wherein the UE is configured to periodically perform radio condition measurements and store the periodically performed measurements in a UE buffer as logged measurements, the method comprising:
- receiving a request from the network node to start transmitting logged measurements in a report message;
- determining if the logged measurements fit in the report message; and if not,
- including in the report message an indicator of additional logged measurements not yet transmitted; and,
- transmitting the report message, comprising the indicator, to the network node as a response to the request.

23. The method according to claim 22, wherein the including comprises including a reporting time stamp in the report message.

24. The method according to claim 22, wherein the logged measurements that are transmitted to the network node are further deleted from the buffer of the UE.

25. The method according to claim 22, wherein the logged measurements that are oldest in the buffer are reported first.

26. A User Equipment, UE, for assisting in network based control of report messages in a wireless communications network, the UE being in connection with a serving network node and configured to transmit report messages to the network node, and wherein the UE is configured to periodically perform radio condition measurements and store the periodically performed measurements in a buffer as logged measurements, the UE comprises:
- a UE communications interface configured to receive a request from the network node to start transmitting logged measurements in a report message, and to transmit the report message comprising the logged measurements;
- a UE processor circuit configured to determine if the logged measurements fits in the report message, and if not, indicating in the report message to be transmitted an existents of additional logged measurements not yet transmitted.

27. The User Equipment according to claim 26, wherein the UE processor circuit is configured to add a reporting time stamp to the reporting message.

28. The User Equipment according to claim 26, wherein the logged measurements that are transmitted to the network node are further deleted from the buffer of the UE.

29. The User Equipment according to claim 26, wherein the logged measurements that are oldest in the buffer are transmitted first.

30. The User equipment according to claim 26, wherein the logged measurements are Minimizing Drive Tests, MDT, log data.

* * * * *

UNITED STATES PATENT AND TRADEMARK OFFICE
CERTIFICATE OF CORRECTION

PATENT NO. : 8,798,658 B2  
APPLICATION NO. : 13/001687  
DATED : August 5, 2014  
INVENTOR(S) : Persson et al.

Page 1 of 1

It is certified that error appears in the above-identified patent and that said Letters Patent is hereby corrected as shown below:

In the Claims

Column 12, Line 26, in Claim 1, delete "Method" and insert -- A method --, therefor.

Column 14, Line 6, in Claim 22, delete "Method" and insert -- A method --, therefor.

Signed and Sealed this  
Third Day of March, 2015

Michelle K. Lee  
*Deputy Director of the United States Patent and Trademark Office*